(12) United States Patent
Jumelet et al.

(10) Patent No.: US 11,486,642 B2
(45) Date of Patent: Nov. 1, 2022

(54) MULTI-CHAMBER MELTING FURNACE AND METHOD FOR MELTING NON-FERROUS SCRAP METAL

(71) Applicant: GAUTSCHI ENGINEERING GMBH, Berg TG (CH)

(72) Inventors: Tom Jumelet, Berg TG (CH); Patrick Luttinger, Braunau am Inn (AT); Herbert Hubbauer, Braunau am Inn (AT)

(73) Assignee: GAUTSCHI ENGINEERING GMBH, Berg (CH)

( * ) Notice: Subject to any disclaimer, the term of this patent is extended or adjusted under 35 U.S.C. 154(b) by 481 days.

(21) Appl. No.: 16/489,754

(22) PCT Filed: Feb. 27, 2018

(86) PCT No.: PCT/EP2018/054785
§ 371 (c)(1),
(2) Date: Aug. 29, 2019

(87) PCT Pub. No.: WO2018/158237
PCT Pub. Date: Sep. 7, 2018

(65) Prior Publication Data
US 2020/0011602 A1    Jan. 9, 2020

(30) Foreign Application Priority Data

Mar. 1, 2017 (DE) .................. 10 2017 104 241.5

(51) Int. Cl.
*F27B 3/18* (2006.01)
*C22B 7/00* (2006.01)
(Continued)

(52) U.S. Cl.
CPC .............. *F27B 3/186* (2013.01); *C22B 1/005* (2013.01); *C22B 7/003* (2013.01);
(Continued)

(58) Field of Classification Search
CPC .... F27B 3/186; F27B 1/02; F27B 1/08; F27B 3/04; F27B 3/06; F27D 13/002;
(Continued)

(56) References Cited

U.S. PATENT DOCUMENTS 3,008,819 A * 11/1961 Hofer .................. F27B 1/02
                                                      75/574
4,572,485 A    2/1986 Engelberg et al.
(Continued)

FOREIGN PATENT DOCUMENTS

DE    2045737    3/1972
DE    3412964    3/1985
(Continued)

OTHER PUBLICATIONS

Search Report issued in Int'l App. No. PCT/EP2018/054785 (dated 2018).

*Primary Examiner* — Scott R Kastler
(74) *Attorney, Agent, or Firm* — Barnes & Thornburg LLP

(57) ABSTRACT

A multi-chamber melting furnace for melting scrap of non-ferrous metals, in particular aluminum scrap, including a first shaft furnace with a shaft for charge material, in which impurities of the charge material can be removed, and at least one furnace chamber which is connected to the shaft of the first shaft furnace and has a first heat supply device, wherein at least one second shaft furnace with a shaft for charge material, in which shaft impurities of the charge material can be removed, the furnace chamber being connected to the shaft of the second shaft furnace and being arranged between the shafts in such a manner that the furnace chamber forms a main melting chamber in which the molten bath is located during operation.

10 Claims, 5 Drawing Sheets

(51) Int. Cl.
*F27B 1/08* (2006.01)
*F27D 13/00* (2006.01)
*F27D 27/00* (2010.01)
*C22B 1/00* (2006.01)
*C22B 21/00* (2006.01)
*F27B 1/02* (2006.01)
*F27B 3/04* (2006.01)
*F27B 3/06* (2006.01)
*F27D 19/00* (2006.01)

(52) U.S. Cl.
CPC ............ *C22B 21/0092* (2013.01); *F27B 1/02* (2013.01); *F27B 1/08* (2013.01); *F27B 3/04* (2013.01); *F27B 3/06* (2013.01); *F27D 13/002* (2013.01); *F27D 27/00* (2013.01); *F27D 2019/0012* (2013.01)

(58) Field of Classification Search
CPC ......... F27D 27/00; C22B 1/005; C22B 7/003; C22B 21/0092
See application file for complete search history.

(56) References Cited

U.S. PATENT DOCUMENTS

| | | | |
|---|---|---|---|
| 6,053,728 | A | 4/2000 | Alchalabi et al. |
| 2001/0028136 | A1 | 10/2001 | Hertwich |
| 2009/0044568 | A1* | 2/2009 | Lewis ................ F27B 1/20 65/134.4 |
| 2020/0011602 | A1* | 1/2020 | Jumelet ............. C22B 7/003 |

FOREIGN PATENT DOCUMENTS

| | | |
|---|---|---|
| DE | 19627059 | 1/1998 |
| DE | 10325153 | 12/2004 |
| DE | 102010064116 | 6/2012 |
| EP | 1146304 | 10/2001 |
| EP | 1612498 A1 | 1/2006 |
| GB | 2493493 | 2/2013 |

\* cited by examiner

MULTI-CHAMBER MELTING FURNACE AND METHOD FOR MELTING NON-FERROUS SCRAP METAL

CROSS REFERENCE TO RELATED APPLICATIONS

This application is a U.S. nationalization under 35 U.S.C. § 371 of International Application No. PCT/EP2018/054785, filed Feb. 27, 2018, which claims priority to German Patent Application No. 102017104241.5, filed Mar. 1, 2017. The disclosures set forth in the referenced applications are incorporated herein by reference in their entireties.

DESCRIPTION

The invention relates to a multi-chamber melting furnace for melting non-ferrous scrap, in particular aluminum scrap. Such a furnace is known, for example, from DE 10 325 153 A1. The invention further relates to a method for melting of non-ferrous scrap, in particular aluminum scrap.

In aluminum production, a distinction is made between primary aluminum produced from bauxite and secondary aluminum produced by remelting aluminum scrap. Since the production of secondary aluminum requires much less energy than the production of primary aluminum and is therefore generally more environmentally friendly, the production of secondary aluminum is gaining in importance. For this purpose, shaft melting furnaces according to DE 10 325 153 A1 are used, in which the charge material is preheated, heated and liquefied in the melting shaft. A melting bridge is arranged in the melting shaft on which the charge material remains and is subjected to heat until the charge material liquefies and flows into the furnace chamber located under the melting bridge, which furnace chamber functions as a holding furnace for the molten bath. This concept of a two-chamber furnace with a melting bridge and a separate holding furnace enables high quality aluminum to be produced with a low concentration of impurities. This is due to the fact that during the dwell time on the melting bridge, impurities of the aluminum scrap, such as lacquers and oil, are thermally removed. A further development of the shaft melting furnace according to DE 10 325 153 A1 with regard to heat recovery is described in DE 10 2010 064 116 A1, which upholds the well-known concept of the two-chamber furnace with a melting bridge and a separate holding furnace.

The well-known melting units are of a complex design, require intensive maintenance and can be optimized with regard to energy requirements.

It is an object of the invention to improve a multi-chamber furnace for melting scrap of non-ferrous metals, in particular aluminum scrap, in such a manner that it is as inexpensive as possible in terms of acquisition and operation while achieving good melting capacity and metal quality. It is a further object of the invention to specify a corresponding method for melting non-ferrous scrap, in particular aluminum scrap.

According to the invention, this object is achieved with regard to the multi-chamber furnace and with regard to the method by the subject matter disclosed herein.

The invention is based on the idea of specifying a multi-chamber melting furnace for melting non-ferrous scrap, in particular aluminum scrap, which comprises a first shaft furnace with a shaft for charging material. Impurities of the charge material can be removed in the shaft. The multi-chamber melting furnace comprises at least one furnace chamber connected to the shaft of the first shaft furnace, and a first heat supply device. According to the invention, the multi-chamber melting furnace comprises at least one second shaft furnace with a shaft for charge material in which impurities of the charge material can be removed. The furnace chamber is connected to the shaft of the second shaft furnace and arranged between the shafts in such a manner that the furnace chamber forms a main melting chamber in which the molten bath is located during operation.

The second shaft furnace results in a simple, compact and low-maintenance multi-chamber furnace with high melting capacity. In contrast to the known furnaces, the furnace chamber not only has a holding function for the molten bath generated on the melt bridge in the known furnaces, but also serves as the main melting chamber. In other words, the shafts of the shaft furnaces are mainly used for thermal cleaning and preheating of the scrap. The melting of the scrap takes place mainly in the common furnace chamber. For this purpose, the furnace chamber is arranged between the shafts and connected to them in such a manner that the furnace chamber forms the main melting chamber. This means that the melting energy is mainly supplied to the scrap in the furnace chamber.

Known from DE 34 12 964 C2, which traces back to the applicant or its legal predecessor, is a multi-chamber furnace for melting aluminum scrap, which comprises two charging shafts. The scrap is fed into the respective charging shaft together with molten metal which moistens and partially liquefies the scrap. The molten metal is pumped via a pipe into the respective charging shaft. This furnace is not suitable for the production of secondary aluminum from contaminated scrap because the impurities in the charging shaft cannot be removed. In addition, the common furnace chamber between the charging shafts serves exclusively as a holding bath since the entire melting energy is supplied to the two primary melting chambers.

Within the scope of the application, the term aluminum also includes aluminum alloys.

Preferred embodiments of the invention are disclosed herein.

Thus, the furnace chamber and the lower end of the shafts can be directly connected to each other. Together with the lower shaft ends, i.e. the respective shaft base, the furnace chamber therefore forms a continuous, common chamber which extends over the entire furnace width. This has the advantage that the charge material passes through the shafts directly into the molten bath where it is liquefied. In the shafts, the process steps preheating, heating and removal of impurities, in particular organic impurities, are combined. The charge material is inserted into the shaft in a cold state, sinks in the shaft and heats up in the course of this. Heat is extracted from the exhaust gases generated during the melting process and rising through the shafts. The shaft furnaces therefore operate according to the thermally favorable countercurrent principle. The heat transfer takes place through convection. Due to the geometry, in particular the height of the shafts, the dwell time of the scrap in the shaft can be adjusted such that sufficient heat is introduced into the scrap to remove the impurities before the scrap is immersed in the molten bath at the shaft base.

The furnace chamber and the shafts preferably arranged laterally next to each other. This results in a particularly compact furnace design.

In a particularly preferred embodiment of the multi-chamber melting furnace, the furnace chamber and the shafts each have longitudinal sides which adjoin one another, with the furnace chamber and the shafts being connected to one another along the entire longitudinal sides. This results in a large connection area between the shafts and the furnace chamber for optimum heat transfer from the furnace chamber into the shafts.

The furnace chamber and shafts can form a continuous common furnace bottom. A pump for transporting the melt is therefore not absolutely necessary, so that the furnace structure can be designed in a simple manner. However, it is conceivable to provide a pump or a floor gradient towards the discharge spout.

The shafts can be designed to be free of internal components in such a manner that the charge material reaches the molten bath directly. Specifically, in this embodiment, the melting bridge at the shaft base typically used in the art is omitted.

To increase the heat input into the shafts, each shaft can include a second heat supply device.

Preferably, the shafts are arranged in such a manner that charging is effected by the weight force of the charge material. The shafts are therefore arranged in a substantially vertically manner.

To improve the melting capacity, an agitator, in particular an electromagnetic agitator, can be associated with the furnace chamber, which provides for homogenization of the temperature.

In a preferred embodiment, the multi-chamber melting furnace may have a lifting and lowering device which is connected to the furnace chamber for adjusting an inclination angle of the furnace chamber to facilitate tapping. For smaller furnaces, this device can also be arranged stationarily.

Within the scope of invention there is further proposed a method for melting non-ferrous scrap, in particular aluminum scrap, in which charge material is fed through at least two shaft furnaces to a furnace chamber designed as a main melting chamber, wherein organic impurities of the charge material are removed in the shaft furnaces and the cleaned charge material is transferred from the shaft furnaces directly into the furnace chamber designed as a main melting chamber. With respect to the advantages of the method, reference is made to the explanations on the multi-chamber furnace according to the invention.

The invention is explained in more detail below by means of an exemplary embodiment with reference to the attached schematic drawings.

In the figures

Figure 1:
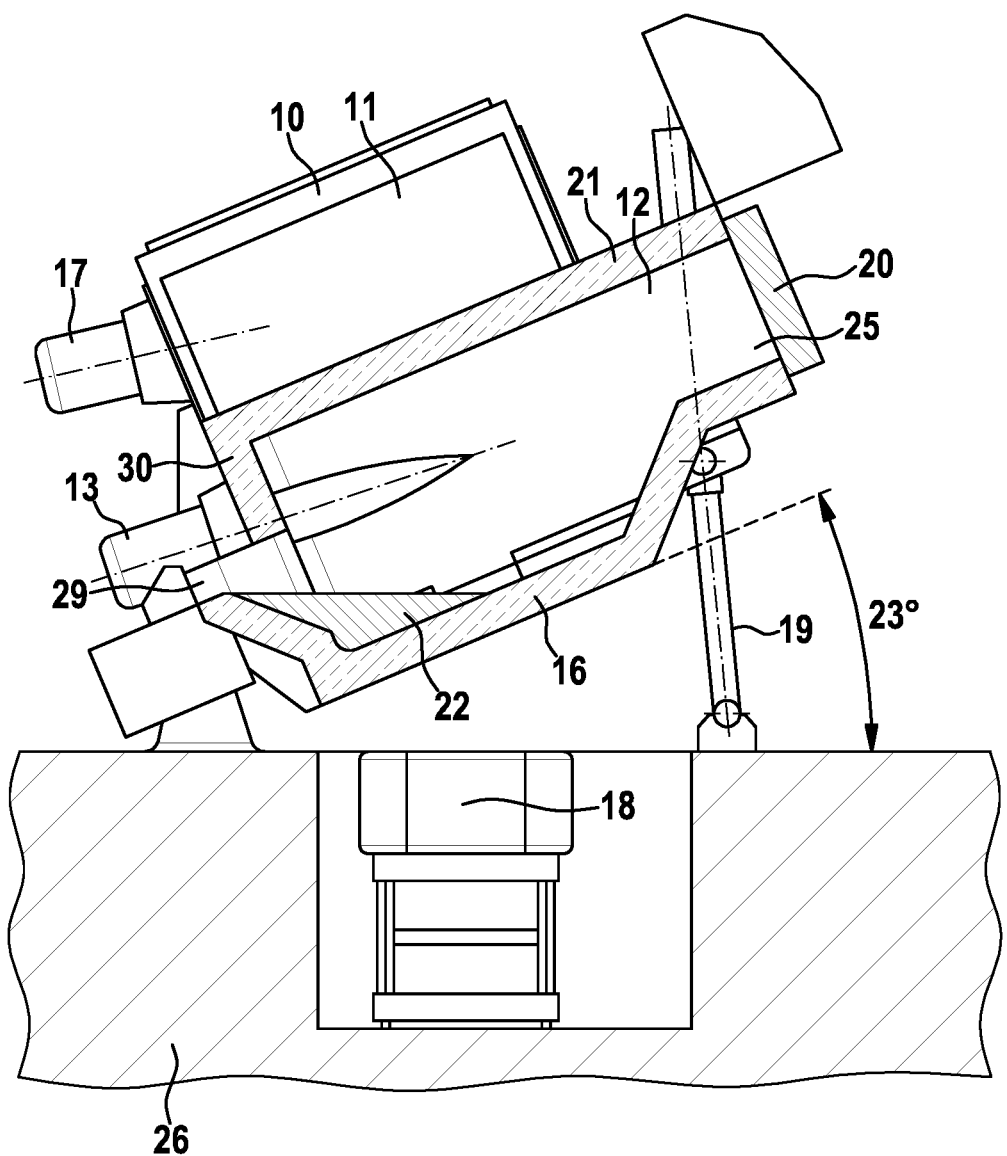
FIG. 1 shows a longitudinal section of a multi-chamber furnace according to an exemplary embodiment according to invention in the area of the furnace chamber.

The multi-chamber furnace according to FIGS. 1 to 5 is used for the production of secondary aluminum from aluminum scrap. Both clean and contaminated aluminum scrap can be processed. Any impurities, in particular organic impurities, such as lacquers or oils, are burned by the exhaust gases produced during the melting process and are removed before melting. The processing of scrap from other non-ferrous metals is possible.

The multi-chamber furnace includes a first shaft furnace 10 and a second shaft furnace 14. A furnace chamber 12 is arranged between the two shaft furnaces 10 and 14. The shaft furnaces 10, 14 and the furnace chamber 12 together form the multi-chamber furnace. The shaft furnaces 10, 14 are in fluid communication with the furnace chamber 12 so that heat and material transfer between the shaft furnaces 10, 14 and the furnace chamber 12 is possible. The furnace chamber 12 forms the main melting chamber, into which the heat required for melting or at least a large amount of the heat required for melting is introduced during operation. The furnace chamber 12 comprises a first heat supply device 13 for this purpose. The latter may comprise one, two or more burners, in particular gas burners, or an electric heater, which can be clearly seen in FIGS. 3 and 5. The furnace chamber is made of a refractory material in a manner known per se.

Figure 3:
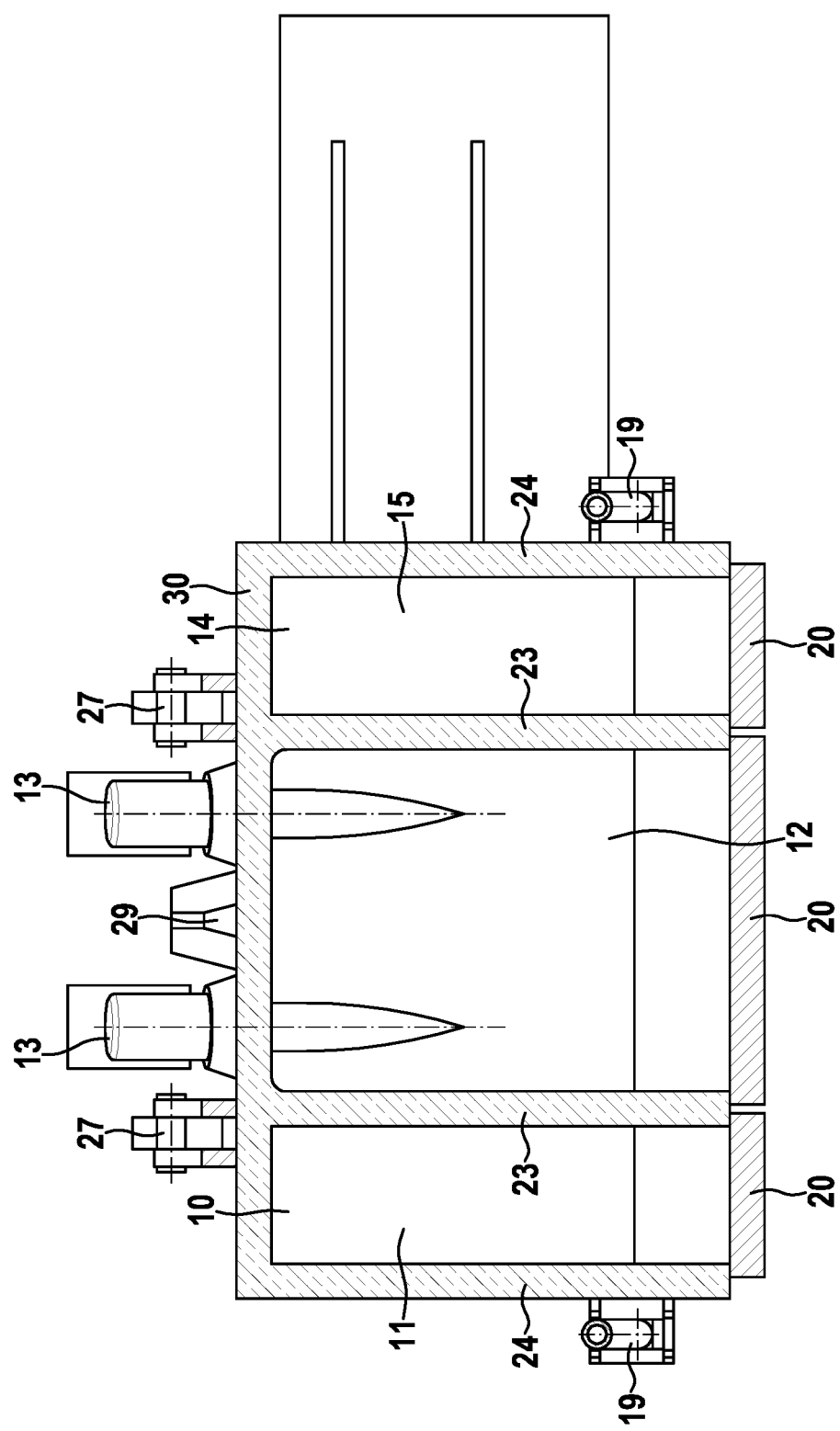
FIG. 3 shows a cross-section of the multi-chamber furnace according to FIG. 1.
Figure 4:
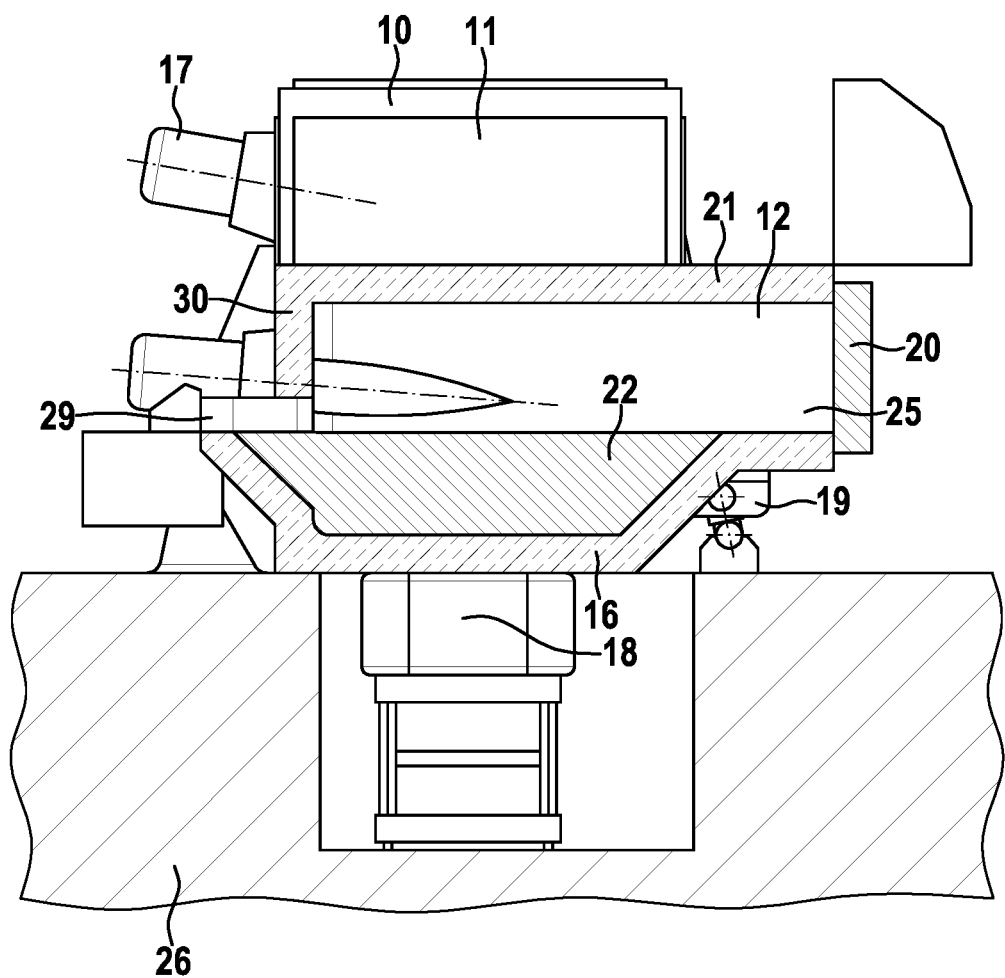
FIG. 4 shows a longitudinal section of the multi-chamber furnace according to FIG. 1 in the area of the shaft furnace in the non-tilted state.
Figure 5:
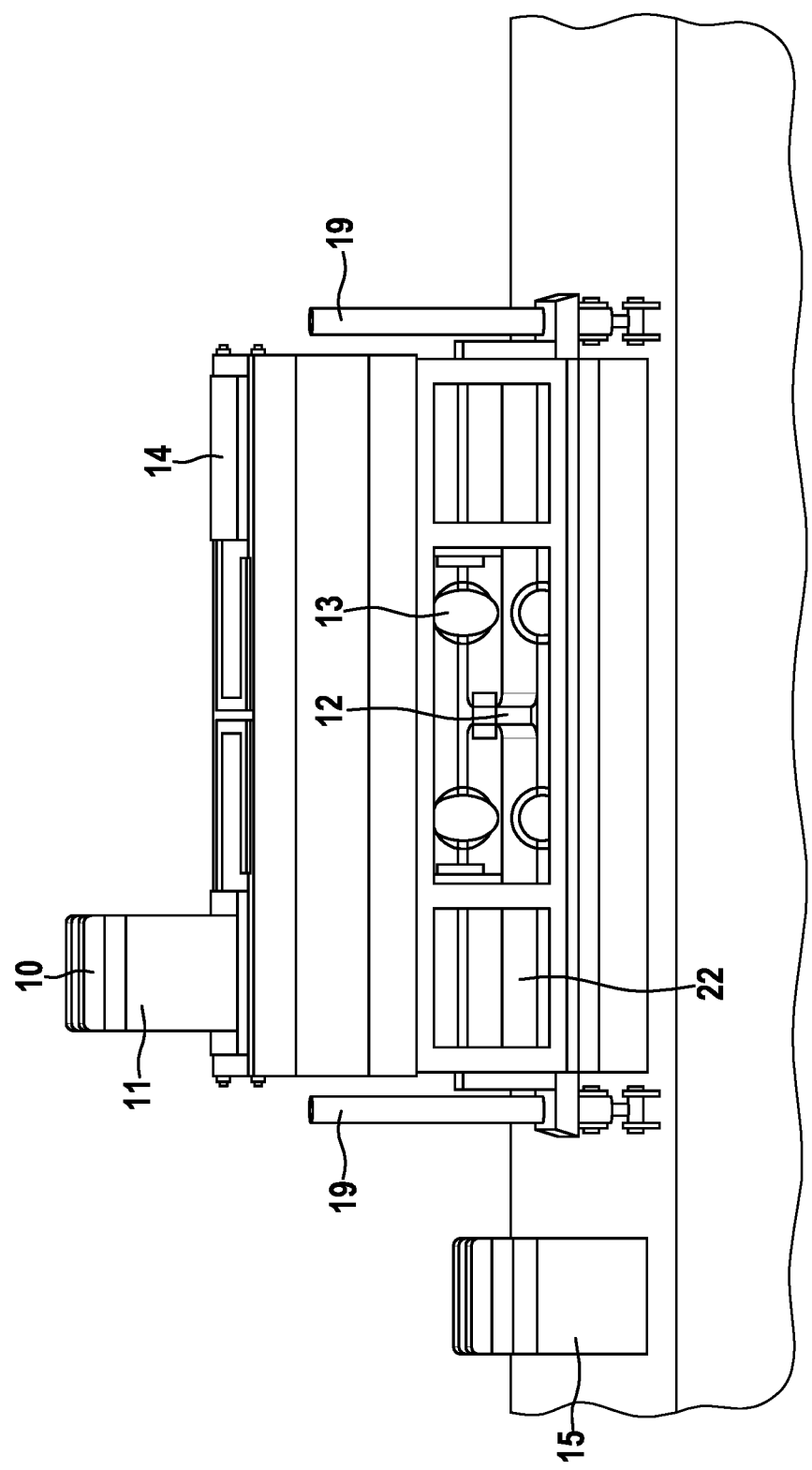
FIG. 5 shows a perspective top view of the multi-chamber furnace according to FIG. 1 with the furnace doors open.

The furnace chamber 12 has a trough-shaped furnace floor 16, which receives the molten bath 22 during operation. On the opposite side of the furnace floor 16, the furnace chamber is bounded by a furnace ceiling 21. In the furnace ceiling 21, openings are formed for the shaft furnaces 11, 14. The furnace chamber 12 has a rear wall 30 to which the burners are attached, which apply heat to the furnace chamber 12 through openings in the rear wall 30. The burners are inclined downwards. Furthermore, on the rear wall 30, the discharge spout 29 is formed. The latter can be designed as a tapping valve for a stationary furnace or as an outlet nozzle for a swiveling furnace. The figures show a swiveling furnace, the rear wall 30 of which is provided with swivel joints 27 which form a horizontal axis of rotation around which the entire furnace can be swiveled, e.g. through an angle of 23°. Other angles are possible. A lifting and lowering device 19 forms the swivel drive and is connected to the furnace floor at a distance from the swivel joints 27. The lifting and lowering device 19 can be formed by one or more hydraulic cylinders which engage at the furnace bottom at a side of the furnace, as shown in FIGS. 3 and 5. Other swivel drives are possible.

The side of the furnace opposite the rear wall provides access to the furnace chamber 12 and is closed during operation by furnace doors 20. As can be seen in FIG. 3, three furnace doors 20 are provided which are associated with the shaft furnaces 11, 14 and the middle furnace chamber 12. The width of the doors 20 corresponds approximately to the width of the shaft furnaces 11, 14 or the furnace chamber 12.

The shaft furnaces 10, 14 are substantially identical. Each shaft furnace 10, 14 has a shaft 11, 15 into which the charge material, i.e. aluminum scrap, can be inserted. Usually, scrap packages are charged. The furnace chamber 12 and the lower end of the shafts 11, 15 are directly connected to each other. The furnace chamber 12 and the melting chambers arranged at the base of the shafts 11, 15 form a continuous common chamber which is filled with melt during operation.

The shafts 11, 15 have inner and outer side walls 23, 24. The outer side walls 24 of the shafts 11, 15 also form the outer side walls of the furnace chamber 12. The inner side walls 23 extend parallel to the outer side walls 24 and end at a distance from the furnace floor 16 in order to create the fluid communication between the shaft furnaces 10, 14 and the furnace chamber 12. The furnace floor 16 extends over the entire width of the furnace at approximately the same height and forms a common floor for the shaft furnaces 10, 14 and the furnace chamber 12. The rear wall 30 of the furnace chamber 12 also forms the rear wall of the shafts 11, 15. During operation, the shafts 11, 15 are covered by a shaft closure 28, which can be removed for charging.

As shown in FIG. 3, the furnace chamber 12 and the shafts 11, are rectangular in cross-section and each has longitudinal sides that adjoin each other. The furnace chamber 12 and the shafts 11, 15 are in fluid communication with each other along the entire longitudinal sides.

Figure 2:
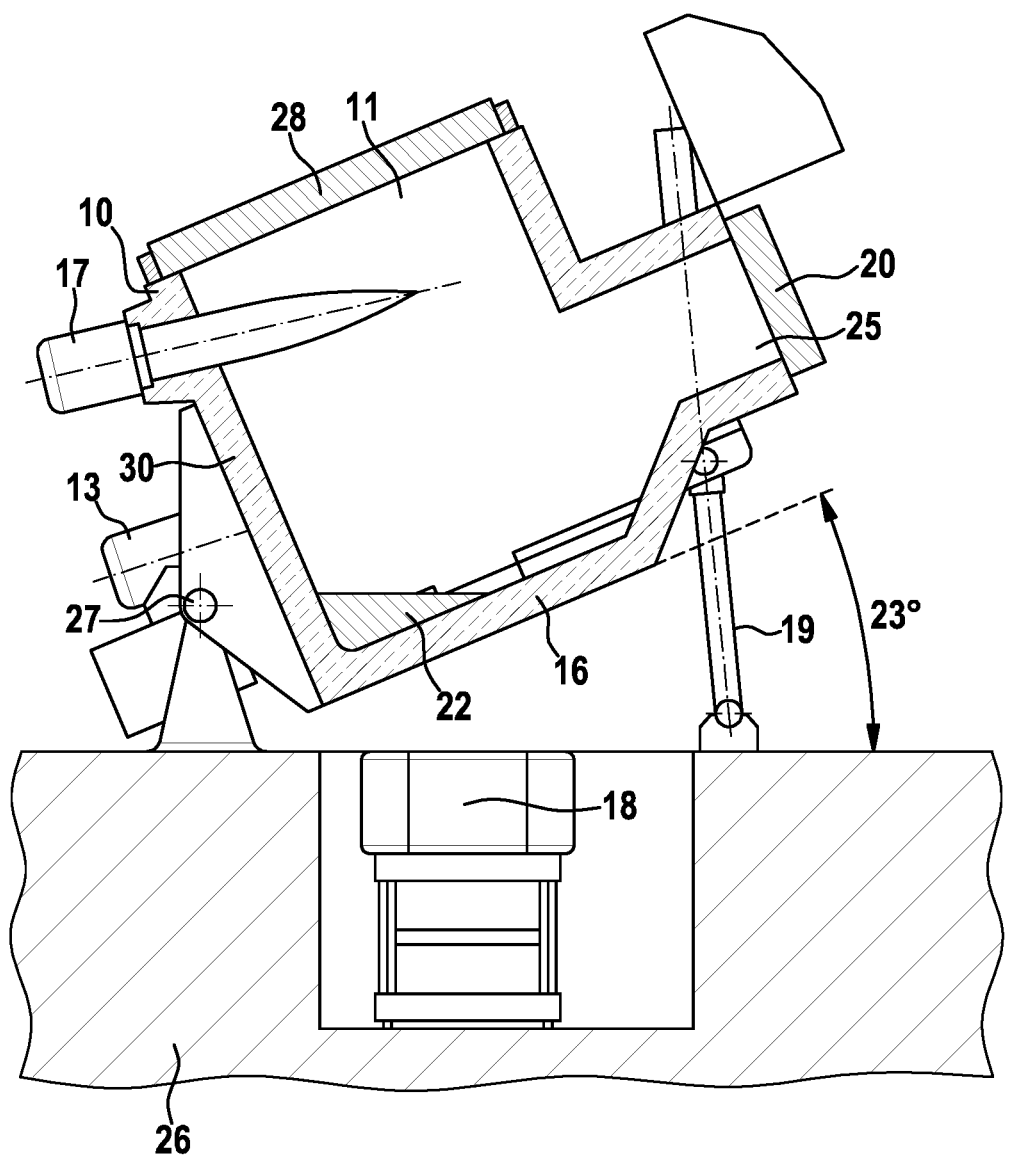
FIG. 2 shows a longitudinal section of the multi-chamber furnace according to FIG. 1 in the area of the shaft furnace.

As can be seen in FIG. 2, the shafts 11, 15 are free of internal components so that the charge material can sink directly onto the furnace floor 16. The furnace is pumpless, i.e. it can be operated without a melt pump. It is possible to add a melt pump. The shafts 11, 15 have second heat supply devices which are designed as burners inclined obliquely downwards. Other heating elements are possible.

The furnace stands on a foundation 26 in which an electromechanical agitator 28 is embedded. In the melting operation (FIGS. 4, 5) the agitator 28 is located below the middle furnace chamber 12, i.e. in the middle of the furnace.

As shown in FIG. 5, at least one of the shafts 11, 15 (here the right shaft 15) can be designed to be removable. This has the advantage that one of the shaft furnaces can be shut down temporarily if the scrap available for melting is not sufficient for simultaneous operation with two shaft furnaces 10, 14. The second shaft furnace 14 is then closed (FIG. 5).

The multi-chamber furnace works as follows.

For starting up or melting clean aluminum scrap, the furnace can be charged via access 25. For this purpose, at least the middle furnace door 20 is opened, as shown in FIG. 5. During melting operation, contaminated aluminum scrap is fed-in via shafts 11, 15, is heated in shafts 11, 15 and decreases in weight as the aluminum scrap liquefies and sinks at the shaft base due to its weight force. In the process of this, impurities in the scrap are burned and thus removed before the respective batch reaches the shaft base and is immersed in the molten bath. Heating is effected by the exhaust gases produced during melting, which rise upwards in shafts 11, 15. Heating in shafts 11, 15 can be increased by the second heat supply devices 17.

The furnace chamber 12 functions as the main melting chamber because the molten bath 22 is permanently heated there to generate the required melting energy for the scrap that is immersing into the molten bath 22 in the area of the shafts 11, 15. During melting operation, the molten bath 22 is moved by the electromagnetic agitator 18.

To remove the melt, the furnace is either tapped off at the discharge spout 29 or tilted (FIGS. 1, 2) so that the melt can flow out of the discharge spout 29.

REFERENCE LIST 10 first shaft furnace
11 shaft
12 furnace chamber
13 first heat supply device
14 second shaft furnace
15 shaft
16 furnace floor
17 second heat supply device
18 agitator
19 lifting and lowering device
20 furnace doors
21 furnace ceiling
22 molten bath
23 inner side walls
24 outer side walls
25 access
26 foundation
27 swivel joints
28 shaft closure
29 discharge spout
30 rear wall

The invention claimed is:

1. A multi-chamber melting furnace for melting scrap of non-ferrous metals comprising a first shaft furnace with a shaft for charge material, in which impurities of the charge material can be removed, and at least one furnace chamber which is connected to the shaft of the first shaft furnace and has a first heat supply device, wherein at least one second shaft furnace with a shaft for charge material, in which impurities of the charge material can be removed, the furnace chamber being connected to the shaft of the second shaft furnace and being arranged between the shafts in such a manner that the furnace chamber forms a main melting chamber in which a molten bath is located during operation, wherein the shafts are arranged in such a manner that charging is effected by the weight force of the charge material directly into the molten bath, and wherein a lifting and lowering device is connected to the furnace chamber for adjusting an inclination angle of the furnace chamber.

2. The multi-chamber melting furnace according to claim 1, wherein the furnace chamber and the lower end of the shafts are directly connected to each other.

3. The multi-chamber melting furnace according to claim 1, wherein the furnace chamber and the shafts are arranged laterally next to each other.

4. The multi-chamber melting furnace according to claim 1, wherein the furnace chamber and the shafts each have longitudinal sides adjoining each other, the furnace chamber and the shafts being connected to each other along the entire longitudinal sides.

5. The multi-chamber melting furnace according to claim 1, wherein the furnace chamber and the shafts form a continuous common furnace floor.

6. The multi-chamber melting furnace according to claim 1, wherein the shafts are designed such that they are free of internal components in such a manner that the charge material is fed directly into the molten bath.

7. The multi-chamber melting furnace according to claim 1, wherein the shafts each have a second heat supply device.

8. The multi-chamber melting furnace according to claim 1, wherein an agitator is associated with the furnace chamber.

9. A method for melting scrap of non-ferrous metals wherein charge material is fed through at least two shaft melting furnaces to a furnace chamber designed as a main melting chamber, wherein organic impurities of the charge material are removed in the shaft melting furnaces and the charge material is transferred directly from the shaft melting furnaces into the furnace chamber designed as a main melting chamber, wherein the shafts are arranged in such a manner that charging is effected by the weight force of the charge material directly into the molten bath, and wherein a lifting and lowering device is connected to the furnace chamber for adjusting an inclination angle of the furnace chamber.

10. The multi-chamber melting furnace according to claim 8, wherein the agitator is an electromagnetic agitator.

* * * * *